United States Patent [19]

Nishiguchi

[11] Patent Number: 5,094,803
[45] Date of Patent: Mar. 10, 1992

[54] STEAM GENERATOR

[75] Inventor: Yohei Nishiguchi, Kawasaki, Japan

[73] Assignee: Kabushiki Kaisha Toshiba, Kawasaki, Japan

[21] Appl. No.: 492,976

[22] Filed: Mar. 13, 1990

[30] Foreign Application Priority Data

May 23, 1989 [JP] Japan .................... 1-129951

[51] Int. Cl.⁵ .......................... G21C 15/24
[52] U.S. Cl. ...................... 376/405; 417/50; 122/32
[58] Field of Search ............ 376/404, 405, 406; 122/32, 33; 165/104.28; 417/50

[56] References Cited

U.S. PATENT DOCUMENTS

| | | | |
|---|---|---|---|
| 3,885,890 | 5/1975 | Davidson | 417/50 |
| 4,765,948 | 8/1988 | DeLuca et al. | 376/404 |
| 4,905,757 | 3/1990 | Boardman et al. | 376/405 |
| 4,983,353 | 1/1991 | Boardman et al. | 376/405 |

FOREIGN PATENT DOCUMENTS

63-116701 7/1988 Japan .

Primary Examiner—Daniel D. Wasil
Attorney, Agent, or Firm—Foley & Lardner

[57] ABSTRACT

A steam generator utilized for a liquid-metal coolant reactor comprises an outer shell body in which an electromagnetic pump is arranged. The electromagnetic pump comprises a hollow cylindrical iron core provided with comb-shaped portion at an outer peripheral surface thereof and an annular stator coil means assembled in the comb-shaped portion of the cylindrical iron core. A main passage of liquid metal is formed on a side on which the stator coil of the iron core is assembled and a cooling bypass passage is formed at substantially the central portion of the cylindrical iron core in a vertically penetrating fashion.

3 Claims, 6 Drawing Sheets

STEAM GENERATOR

BACKGROUND OF THE INVENTION

The present invention relates to a steam generator utilized for a liquid-metal coolant reactor and more particularly, to a steam generator in which an electromagnetic pump is incorporated.

In a fast breeder reactor utilizing a liquid-metal coolant, a primary coolant as a reactor coolant is exposed high levels of to radioactivity, so that it is necessary to isolate a primary cooling system from a steam generation system, and it is also necessary to carry out a heat exchange operation between the liquid metal and water during the steam generating process for supplying the steam to a turbine generator. However, in a fast breeder reactor utilizing a liquid-metal coolant, since an extremely large amount of heat is generally generated due to a chemical reaction based on the heat exchanging operation between the liquid metal and the water, it is necessary to disperse the heat generated. For this reason, a secondary cooling system is generally located between the primary cooling system and the steam generation system.

Figure 8:
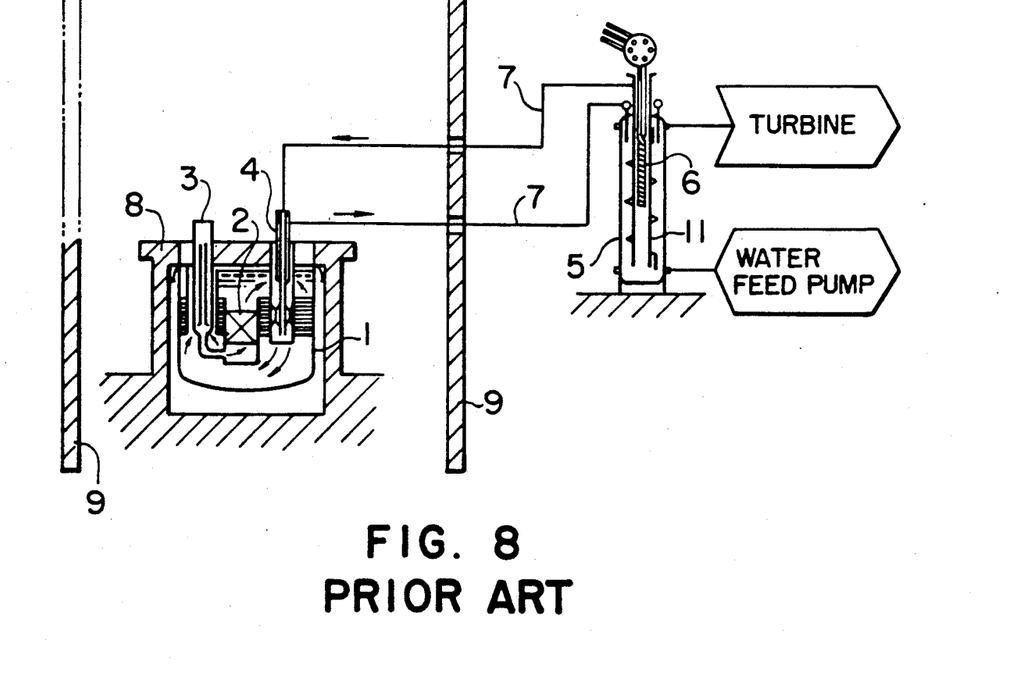
FIG. 8 is a view showing schematic arrangement of a cooling system for a conventional liquid-metal coolant reactor.

A typical example of a cooling system of the liquid-metal coolant reactor of the conventional type described is shown in FIG. 8. Referring to FIG. 8, in a reactor vessel 1, disposed in a roof slab 8, are arranged a reactor core 2 and a primary cooling system comprising a primary main circulation pump 3 for circulating a liquid-metal coolant in the reactor vessel 1 for cooling the core 2, and an intermediate heat exchanger 4 for carrying out the heat exchanging operation between the primary coolant and the secondary coolant.

On the other hand, a secondary cooling system comprises, as shown in FIG. 8, the intermediate heat exchanger 4, a steam generator 5 for generating steam to be supplied to a turbine generator, an electromagnetic pump 6 arranged inside the steam generator 5 for circulating the secondary coolant, and pipings 7 for connecting the equipment described above.

The steam generator 5 is disposed outside the roof slab 8 which is surrounded by a wall structure of the reactor.

The electromagnetic pump 6 is inserted into an upper portion of a liquid-metal outlet rising pipe 11 for sucking the liquid-metal from the lower portion of the rising pipe 11 and for feeding the same towards the intermediate heat exchanger 4. The electromagnetic pump 6 is generally provided with a stator coil (electromagnetic coil) wound around the outer periphery of an inner iron core in a spiral fashion, and an electric current is conducted to the stator coil from an external power source to thereby generate a magnetic field to cause the circulation of the liquid metal.

Figure 9:
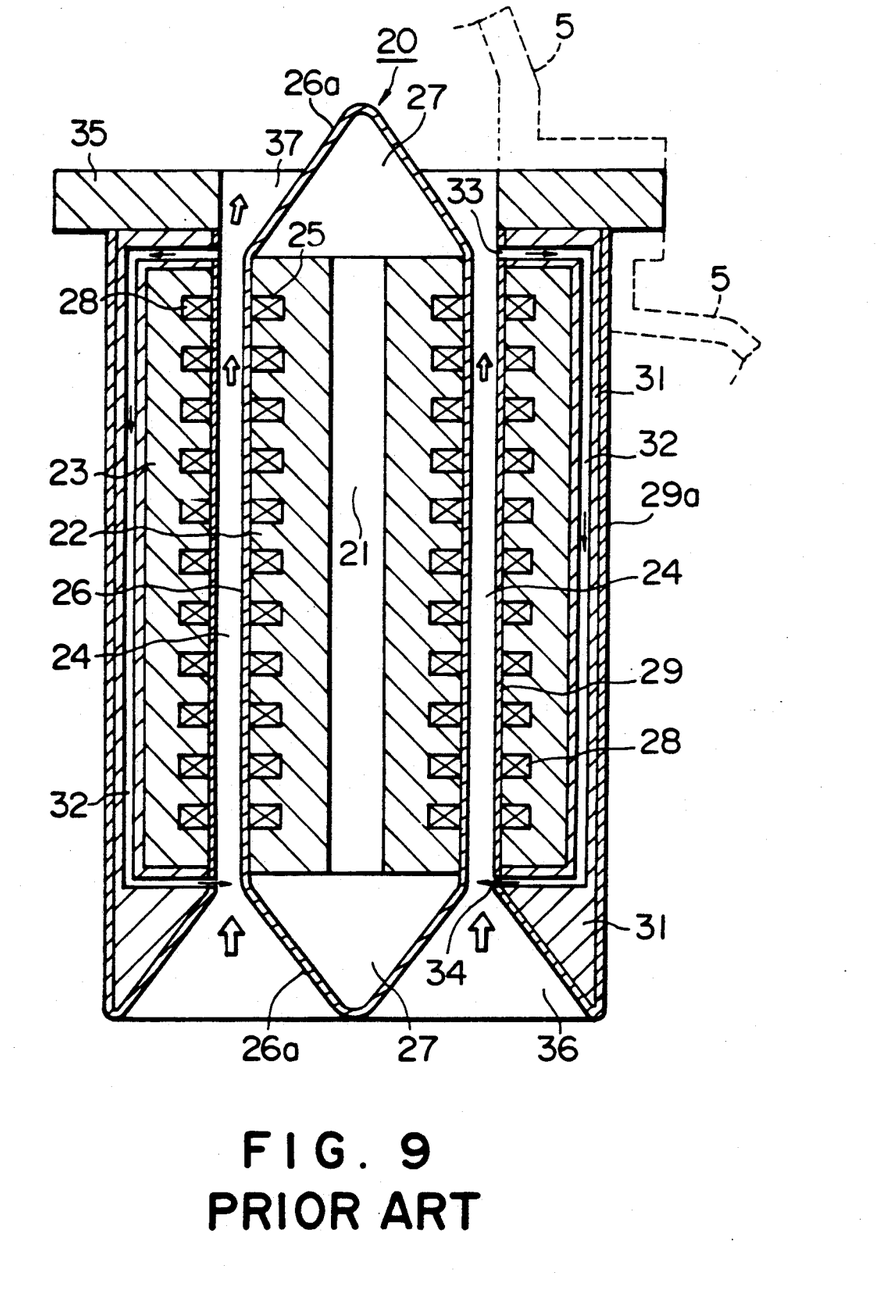
FIG. 9 is an elevational section of a structure of a conventional electromagnetic pump.

During the conduction of the electric current and the operation of the electromagnetic pump 6, heat is generated from the stator coil. Accordingly, it is desired to effectively remove and disperse this heat during the operation thereof. For this purpose, various trials have been carried out for effectively absorbing the heat generated from the stator coil and recovering the same into the metal-liquid to suppress the energy loss during the operation of the reactor to a minimum. FIG. 9 shows one example of an electromagnetic pump proposed for the purpose of achieving the effect described above and disclosed in Japanese Utility Model Laid-open Publication No. 116701/1988.

An electromagnetic pump 20 shown in FIG. 9 comprises an inner iron core 22 provided with an inner through hole 21 and an outer iron core 23 arranged concentrically with space around the outer periphery of the inner iron core 22. The space between the outer periphery of the inner iron core 22 and the inner periphery of the outer iron core 23 is formed as an annular passage 24 through which the liquid metal passes. A first stator coil (electromagnetic coil) 25 is embedded in an annular fashion in the outer peripheral surface of the inner iron core 22, and the outer surface of the first stator coil 25 is completely covered with a sealing member 26. Both of the vertical ends 26a of the sealing member 26 extend beyond the outer end portions of the inner iron core 22 and are connected with each other to be closed and thus define inner spaces 27 at both the ends of the iron core 22. These inner spaces 27 and the through hole 21 are filled with inert gas.

A second stator coil (electromagnetic coil) 28 is embedded in an annular fashion in the inner peripheral surface of the outer iron core 23 and the outer surface of the second stator coil 28 is covered with a sealing member 29. The outer periphery of the outer iron core 23 is surrounded by an annular member 31 having its outer periphery supported by an electromagnetic pump supporting cylinder 29a.

A plurality of bypass passages 32 are formed in the annular member 31 along the axial direction of the outer peripheral surface of the outer iron core 23 and the upper ends and the lower ends of the bypass passages 32 are provided with bypass passage inlets 33 and the bypass passage outlets 34, respectively.

The electromagnetic pump 20 of the structure described above is secured to a flange member 35 which is secured to a flanged portion of the steam generator 5 used to install the electromagnetic pump 20 in the steam generator 5.

The electromagnetic pump 20 operates to draw the liquid metal from a suction port 36 by the magnetic force caused by the first and second stator coils 25 and 28, and the drawn liquid metal flows upwardly in the annular passage 24 and is discharged through a discharge port 37. During this operation, the pressure at the inlet portion 33 of the bypass passage becomes larger than that at the outlet portion 34 of the bypass passage, so that a part of the liquid metal passes the bypass passages 32 and circulates around the outer iron core 23. The first stator coil 25 then generates heat, which is effectively recovered by the liquid metal to thereby suppress the temperature rise due to the heat generated by the first stator coil 25. The recovery of the generated heat by means of the circulating liquid metal possibly minimizes the energy loss in whole the steam generator.

However, with the conventional steam generator of the character described above, the axial through hole 21 of the inner iron core 22 constituting the electromagnetic pump 20 and the spaces 27 defined by the sealing member 26a are closed and the spaces are filled with the inert gas, so that the first stator coil 25 embedded in the inner iron core 22 is cooled by only the liquid metal passing the circular passage 24. For this reason, the cooling effect for the first stator coil 25 of the inner iron core 22 decreases and the temperature rise of the inner iron core 22 is increased, whereby the characteristics of the electromagnetic pump 20 cannot be effectively utilized.

SUMMARY OF THE INVENTION

An object of the present invention is to substantially eliminate the defects and drawbacks encountered in the prior art described above and to provide a steam generator utilized for a liquid-metal coolant reactor provided with an electromagnetic pump capable of effectively cooling a stator coil means of the electromagnetic pump by the flow of liquid metal to thereby effectively reduce the energy loss of steam generator as a whole.

This and other objects can be achieved according to the present invention by providing a steam generator utilized for a liquid-metal coolant reactor comprising an outer body shell of hollow cylindrical structure provided with a water inlet chamber disposed at a lower portion of the body shell, an outlet steam chamber disposed at an intermediate portion of the body shell and a liquid metal inlet portion disposed at an upper portion of the body shell, a heat transfer tube assembly arranged annularly along an inner wall of the body shell so as to connect the water inlet chamber and the outlet steam chamber, a liquid metal rising pipe assembly axially extending substantially a central portion of the body shell and arranged in a radial direction offset from an arrangement of the heat transfer tube assembly, and an electromagnetic pump means arranged at an upper portion inside the liquid metal outlet rising pipe means, the electromagnetic pump means comprising a hollow cylindrical iron core provided with a comb shaped portion at an outer peripheral surface thereof and an annular stator coil means assembled in said comb shaped portion of the cylindrical iron core, a main passage of liquid metal being formed on a side on which the stator coil means of the iron core is assembled, a cooling bypass passage being formed at substantially the central portion of the cylindrical iron core in a vertically penetrating fashion.

In a preferred embodiment, the cylindrical iron core may be formed so as to have inner and outer iron core portions and the stator coil means may also be formed so as to have inner and outer stator coil portions in association with the inner and outer iron core portions.

According to the steam generator of a liquid-metal coolant type reactor of the characters described above, the main flow passage of the liquid metal is formed on the side on which the stator coil of the cylindrical iron core is assembled and the cooling bypass passage is formed so as to penetrate the central portion of the steam generator so that the stator coil assembled in the cylindrical iron core can be cooled by the liquid metal circulating the outer peripheral surface of the stator coil, whereby the heat generated by the stator coil can be effectively absorbed and the excessive temperature rising of the stator coils and iron cores can be suppressed. Accordingly, the heat generation efficiency of the steam generator can be remarkably improved.

DESCRIPTION OF THE PREFERRED EMBODIMENTS

Figure 1:
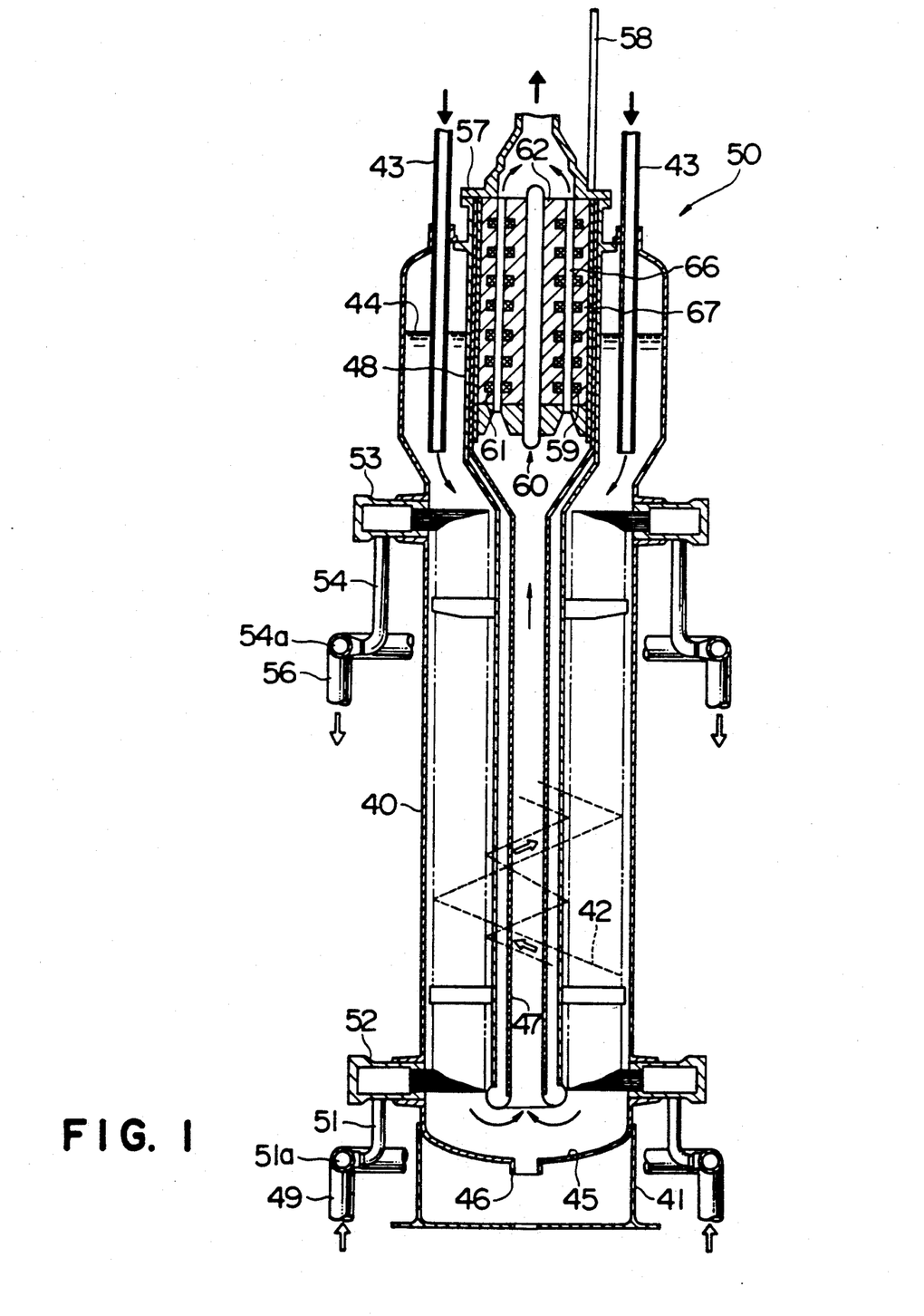
FIG. 1 is an elevational section of a steam generator for a liquid-metal coolant reactor according to a first embodiment of the present invention.
Figure 2:
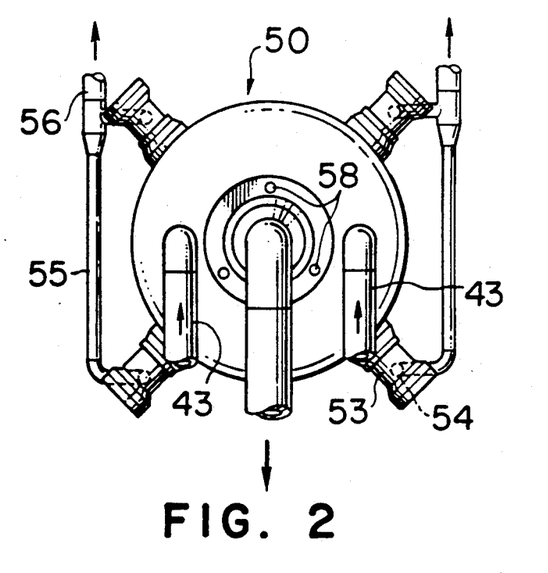
FIG. 2 is a plan view of the steam generator as viewed from the upper side thereof in FIG. 1.

FIG. 1 represents the first embodiment of the present invention and, referring to FIG. 1, a steam generator 50 comprises a body shell 40, a shell supporting skirt 41 and other structural members inclusive of a heat transfer tube assembly 42 located in association with the shell 40 and the supporting skirt 41. An inlet port for liquid metal is composed of a piping system for the liquid metal, not shown, and distributing pipes 43 for the liquid metal inlet.

Inside the body shell 40, as shown in FIG. 1, at the upper portion, is formed a liquid surface 44 for absorbing the change of the inner volume of the liquid metal. The shell 40 is provided with a dish portion 45 at the lower portion thereof and a nozzle 46 is formed to the dish portion 45. As shown in FIG. 1, an outlet rising pipe 47 for the liquid metal is arranged at the inner central portion of the steam generator 50.

Further referring to FIG. 1, water inlet pipes 49 through which water is made to flow by the operation of a water feed pump, not shown, water outlet pipes 51 and water inlet headers 52 are arranged at a water inlet portion, whereas a steam outlet portion comprises outlet steam chambers 53, outlet steam distributing pipes 54, outlet steam headers 54a, and outlet steam pipes 56.

An electromagnetic pump 60 is also arranged in the body shell 40, as shown in FIG. 1, at the upper inner portion of the outlet rising pipe 47 through an installing flange member 57. With respect to a power source, which is not shown in its entirety, for the electromagnetic pump 60, a three phase power source cable is connected to a cable for high temperature use through a terminal box, then through the insides of electric wire tube 58, and is then connected to an outer stator coil 59 and an inner stator coil 61 arranged in the liquid metal.

Figure 3:
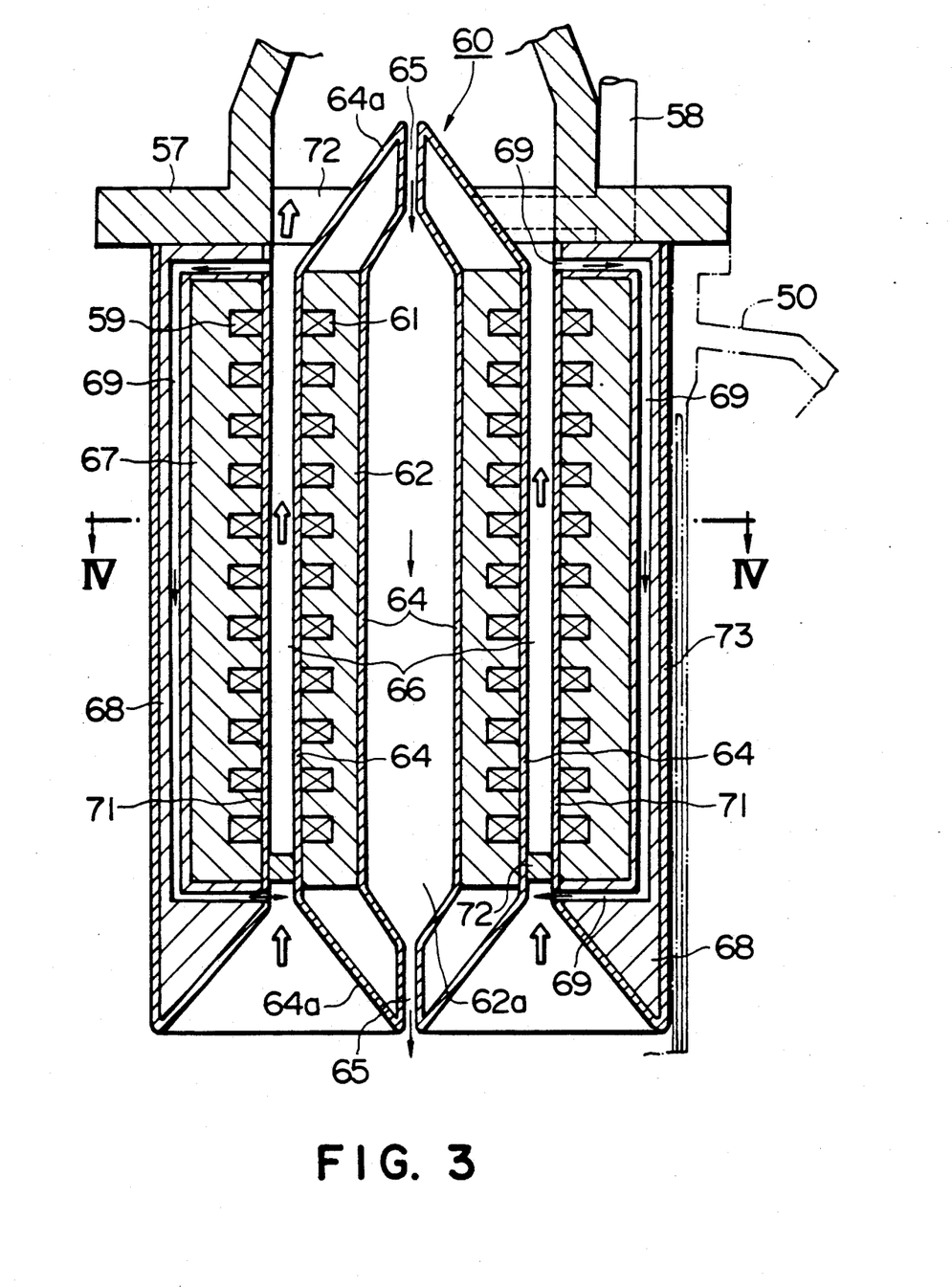
FIG. 3 is an elevational section of an electromagnetic pump of the steam generator shown in FIG. 1.
Figure 4:
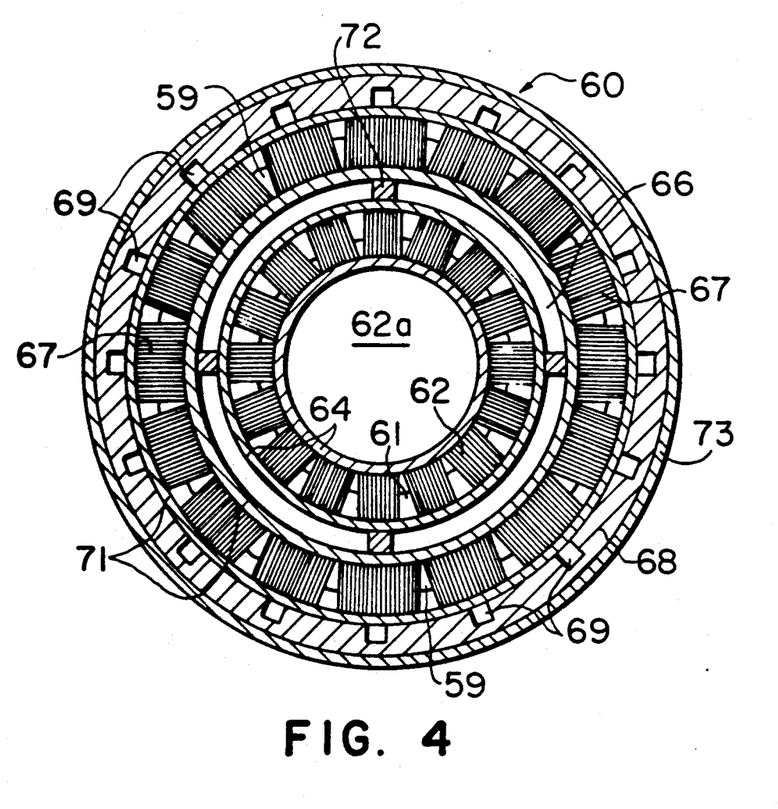
FIG. 4 is a sectional view taken along the line IV—IV shown in FIG. 3.

The inner stator coil 61 is composed of a material of excellent strength and conductivity in a high temperature environment such an alumina dispersion-strength type copper alloy which is enclosed by a material having high electric insulation at a high temperature such as an inorganic ceramic series material, and each of the coil layers are of an annular form. The inner stator coil 61 is integrally composed of a plurality of assemblies each mounted in a close fit manner in recessed portions of a comb-shaped inner iron core 62 formed by laminated plates as shown in FIG. 3 or 4. The thus integrated structure of the inner stator coil exhibits an outer surface which is completely covered with a sealing member 64 made of such as austenite stainless to be isolated from the liquid metal.

The inner iron core 62 is of a hollow cylindrical shape having an inner central through hole 62a, and the sealing member 64 is provided with corn shaped projections 64a extending outwardly at both vertical ends of the sealing member 64. Passages 65 are formed as axial through holes at the central portions of the projections 64a and these passages 65 communicate with the through hole 62a of the inner iron core 62 to thereby form the bypass passage 62a and 65 for cooling the same. The sealing member 64 is also disposed on the side of the bypass passage 62a and 65 so as to completely enclose the inner iron core 62 and the inner stator coil 61.

A hollow cylindrical outer iron core 67 is disposed outside the inner iron core 62 in a concentric arrangement therewith with an annular space 66 therebetween. The outer iron core 67 is provided with an inner peripheral portion formed in comb shape and an annular outer stator coil 59 is mounted in a close fit manner in the comb shaped portion.

The outer peripheral portion of the outer iron core 67 are embedded in the inner peripheral surface of an annular member 68, to which a plurality of cooling bypass passages 69 are formed in parallel with the outer peripheral surface of the outer iron core 67. The respective upper and lower ends of each cooling bypass passage 69 communicate with the upper and lower portions of the annular space 66, respectively.

The outer iron core 67 and the assembled outer stator coil are covered with a sealing member 71. The inner iron core 62 is supported inside the outer iron core 67 by a support member 72 arranged between the inner iron core 62 and the outer iron core 67. The outer peripheral surface of the annular member 68 is supported by an electromagnetic pump supporting cylinder 73 which is arranged inside the body shell 40 of the steam generator 50.

The steam generator of the structure according to the described embodiment operates as follows.

When the electromagnetic pump 60, accommodated in the steam generator 50, is energized, the liquid metal, operable as a secondary coolant, is circulated and delivered to the intermediate heat, exchanger (see FIG. 8) to obtain heat and the temperature of the liquid metal becomes high. The liquid metal of high temperature is delivered to the steam generator and is fed into the body shell 40 through the liquid metal inlet distributing pipes 43.

The liquid metal of high temperature then rises into the outlet rising pipe 47 opening at the lower portion of the steam generator 50 and is circulated, after applied with a discharge pressure by the electromagnetic pump 60, into the intermediate heat exchanger 4 through the piping 7 shown in FIG. 8.

On the other hand, with the water and steam supplying side, the feed water fed by the operation of the water feed pump, not shown, is pumped into the water inlet header 51a through the water inlet pipe 49 and is then distributed into a plural number of flows through the water inlet distributing pipes 51 and finally into the water inlet chamber 52. The water distributed from the water inlet chamber 52 and fed into the interior of the heat transfer tube assembly 42 flows upwardly in the heat transfer tube assembly 42 and performs heat exchange operation between the water and the liquid metal. During this heat exchange operation, the water is highly heated to change into steam, which is then fed into the outlet steam chamber 53. The steam thus generated is distributed into a plurality of flows by the outlet steam distributing pipes 54 and is then combined at the outlet steam header 54a. The steam is finally delivered to the steam turbine, not shown, through the outlet steam distributing pipes 56.

In the meantime, the electromagnetic pump 60 according to the present embodiment includes the inner and outer iron stator coils 61 and 59 which are tightly fitted to the comb shaped portions formed to the inner and outer iron cores 62 and 67. Accordingly, the magnetic fluxes caused by the stator coils 61 and 59 can be almost converged by the respective iron cores 62 and 67, and even in a case of an electromagnetic pump of large capacity, a sufficient pumping efficiency such as of 40 to 50% can be achieved. Moreover, excessive or abnormal temperature rise in the respective stator coils 61 and 59 and, hence, the inner and outer iron cores 62 and 67, can be definitely eliminated by the backward flow of the liquid metal from the discharge side of the pump to the suction side due to the location of the liquid metal bypass passages 62a, 65 and 69 through the heat removing function.

This is to say that in detail, a part of the liquid metal of low temperature flowing upwardly in the main passage, i.e. the annular space 66, due to the operation of the electromagnetic pump 60, flows into the cooling bypass passages 65, 62a and 69 and, in these bypass passages, the liquid metal flows downwardly as shown by arrows in FIG. 3 because the upper portion of the annular space 66 is in a high pressure state and the lower portion thereof is in a low pressure state.

Accordingly, the inner stator coil 61 and the inner iron core 62 are subjected to the heat removing function from the front and rear sides thereof by the liquid metal passing the annular space 66 and the bypass passages 65 and 62a, whereby the heat generated by the inner stator coil 61 is effectively absorbed and recovered to the liquid metal. In addition, the temperature rise of the outer iron core due to the heat generation of the outer stator coil 59 can be effectively suppressed by the heat removing function of the liquid metal passing through the bypass passage 69 formed outside the outer iron core 67.

All the heat energy recovered to the liquid metal can be effectively utilized for a power generation system such as turbine generator. For example, in a case where the heat energy is utilized for a turbine generator, it is supposed that the energy conversion efficiency into electric energy is about 40%, almost all the energy loss (60 to 50%) of the electric energy which is not converted into fluid energy by the electromagnetic pump 60 is the energy loss of the respective stator coils 59 and 61 and the iron cores 62 and 67. Such energy loss can be almost completely recovered however, and accordingly, electric energy of about 24 to 30% of that applied to the electromagnetic pump 60 is again converted into electric energy. Thus, the apparent pumping efficiency of the electromagnetic pump becomes 64 to 70%, which is not substantially less than that due to the operation of a mechanical pump.

Figure 5:
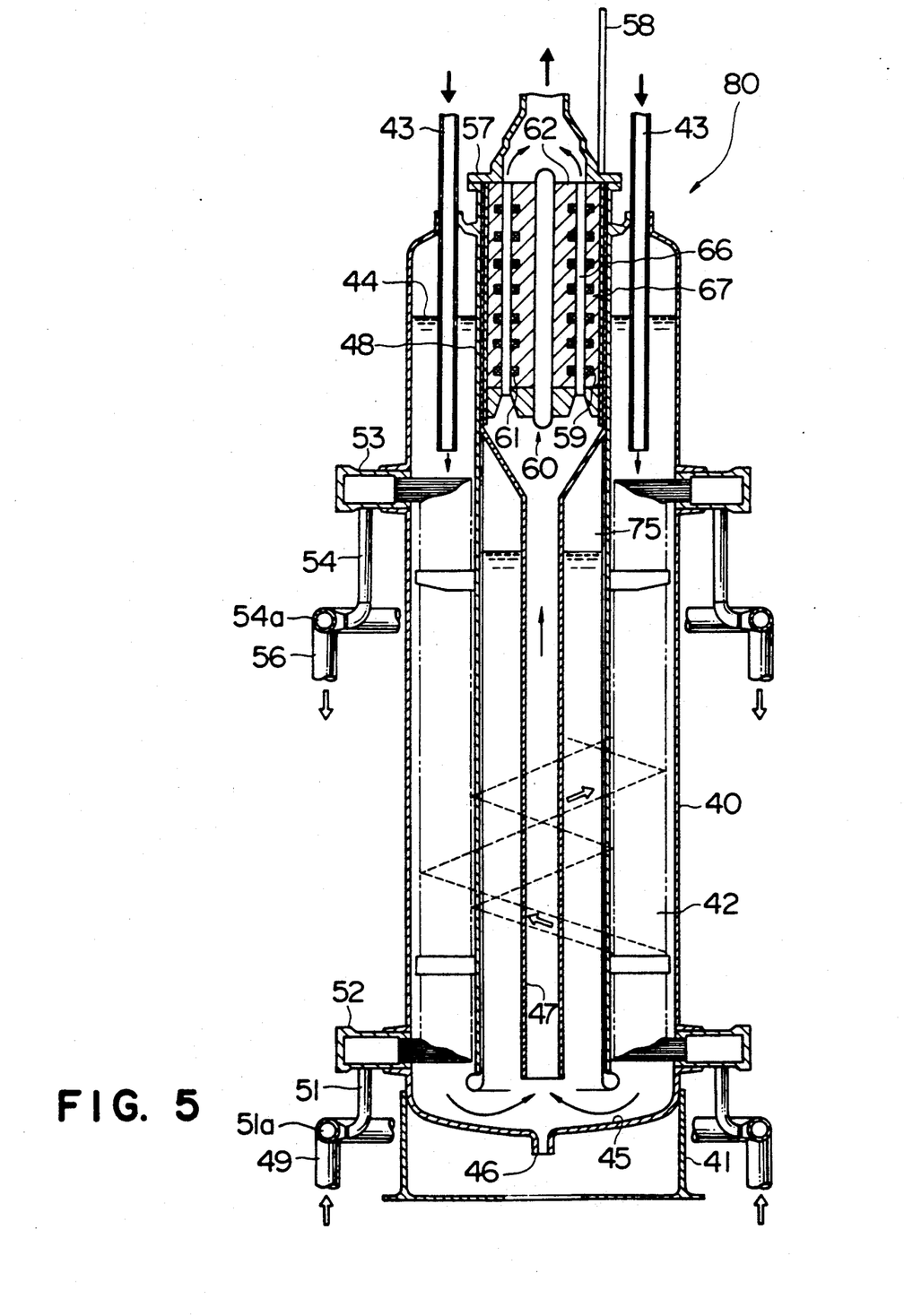
FIG. 5 is an elevational section of a steam generator according to a second embodiment of the present invention.
Figure 6:
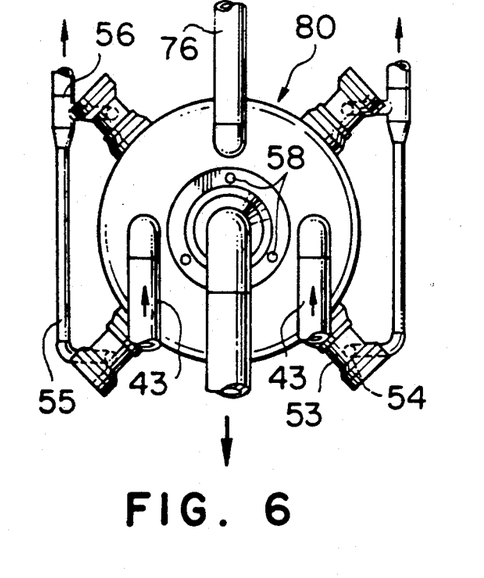
FIG. 6 is a plan view of the steam generator as viewed from the upper side thereof in FIG. 5.

FIGS. 5 and 6 represent the second embodiment according to the present invention in which a reaction pressure controlling cylinder 75 is disposed between the outlet rising pipe 47 and an inside shroud 48 of the heat transfer tube as shown in FIG. 1 with reference to the first embodiment of the present invention.

Referring to FIGS. 5 and 6, an intermediate space of double cylindrical shape, formed between the outlet rising pipe 47, for the liquid metal and the inside shroud 48 of the heat transfer pipes, is formed as the reaction pressure controlling cylinder 75 is filled with liquid having a liquid surface communicating with the liquid metal of the low temperature side of a steam generator 80. A reaction pressure releasing pipe 76 is arranged as shown in FIG. 6 at the upper portion of the steam generator 80, and a rupture disk, not shown, is arranged for the reaction pressure releasing pipe 76.

Except for the above structure of the steam generator, the second embodiment is provided with substantially the same structure as that of the first embodiment, and the operation or function of the steam generator 80 itself is substantially the same as that of the steam generator 50 of the first embodiment.

The arrangement of the reaction pressure controlling cylinder 75 can effectively attain a remarkable damping effect by means of the liquid metal filling therein against a violent pressure propagation and a pressure rising due to accidents of the heat transfer tube assembly 42, for example. Particularly, the soundness and the reliability of the structure such as electromagnetic pump 60, located on the low temperature side of the steam generator 80, and the intermediate heat exchanger 4 (FIG. 8) and pipes, both arranged external to the steam generator 80, can be effectively improved.

The arrangement of the reaction pressure releasing pipe 76 enables auxiliary equipment such as a liquid metal recovery tank required for the protection of the steam generator 80.

Figure 7:
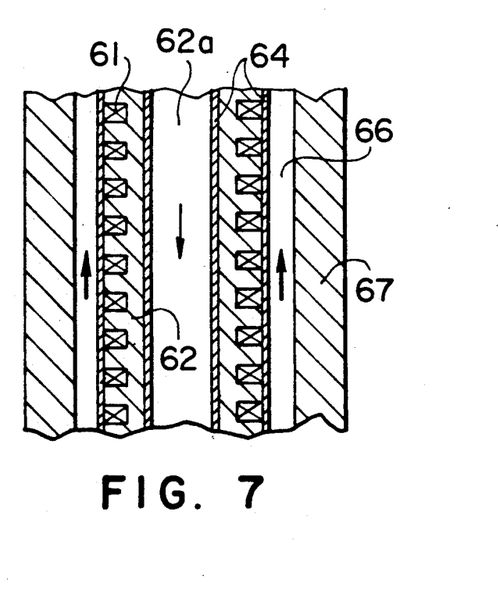
FIG. 7 is an enlarged sectional view of a portion of an electromagnetic pump according to a third embodiment of the present invention.

FIG. 7 further represents the third embodiment according to the present invention in which stators have structures different from those of the first embodiment. Referring to FIG. 7, the electromagnetic pump of this embodiment comprises an inner iron core 62 and an inner stator coil 61 which is assembled in the outer periphery of the inner iron core 62. The inner stator coil 61 and the inner iron core 62 are covered with a sealing member 64. The central through hole 62a of the inner iron core 62 is formed as a bypass passage through which the liquid metal passes. An annular space 66, formed between the outer iron core 67 and the inner iron core 62, is also formed as a main passage for the liquid metal.

According to the structure of the third embodiment, the central through hole 62a is formed as a cooling bypass passage, so that the heat generated from the inner stator coil 61 is effectively absorbed by the liquid metal flow.

As described hereinbefore, according to the present invention, the main flow passage of the liquid metal is formed on the side on which the stator coil of the cylindrical iron core is assembled and the cooling bypass passage is formed to penetrate the central portion of the steam generator, so that the heat generated by the stator coil can be effectively absorbed and the excessive temperature rising of the stator coils and iron cores can be suppressed, whereby the heat generation efficiency of the steam generator can be remarkably improved.

What is claimed is:

1. A steam generator utilized for a liquid-metal coolant reactor comprising:
   an outer body shell of hollow cylindrical structure provided with a water inlet chamber disposed at a lower portion of the body shell, an outlet steam chamber disposed at an intermediate portion of the body shell, and a liquid metal inlet portion disposed at an upper portion of the body shell;
   a heat transfer tube arranged in an annular space formed by an inner wall of the body shell so as to connect said water inlet chamber and said outlet steam chamber;
   a liquid metal outlet rising pipe axially extending along substantially a central portion of said body shell and
   an electromagnetic pump arranged at an upper portion inside said liquid metal outlet rising pipe;
   said electromagnetic pump comprising a hollow cylindrical iron core provided with a comb-shaped portion at an outer peripheral surface thereof and an annular stator coil assembled in the comb-shaped portion of the cylindrical iron core, a main passage of liquid metal being formed on a side on which said stator coil of the iron core is assembled, a cooling bypass passage being formed at substantially the central portion of said cylindrical iron core in a vertically penetrating fashion; and
   wherein said cylindrical iron core comprises an inner iron core portion and an outer iron core portion disposed proximate an outer peripheral surface of said inner iron core portion with a concentric space formed therebetween and said coil is assembled in an outer peripheral surface of said inner iron core portion and in an inner peripheral surface of said outer iron core portion.

2. A steam generator according to claim 1, further comprising additional cooling bypass passages formed at a central portion of said inner iron core portion and on an outer peripheral side of said outer iron core portion.

3. A steam generator according to claim 1, further comprising a reaction pressure suppressing cylinder disposed outside of said outlet rising pipe concentrically therewith with a space formed therebetween for the communication of liquid metal, and a reaction pressure releasing pipe arranged in association with said reaction pressure suppressing cylinder.

* * * * *